Figure 9:
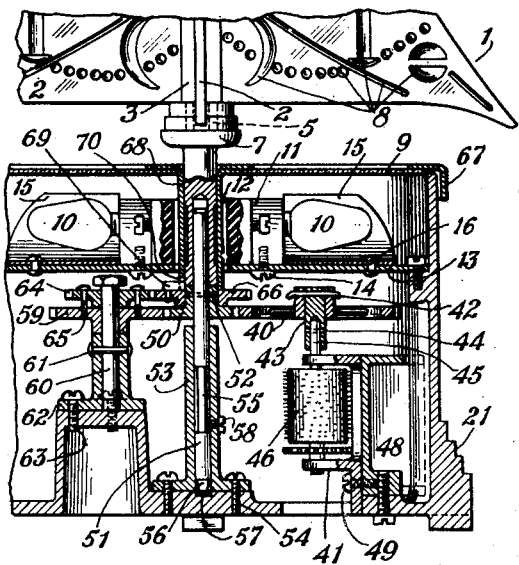

April 7, 1942.  E. L. SNYDER  2,279,182
ORNAMENTAL TREE
Filed Feb. 26, 1940   2 Sheets-Sheet 1
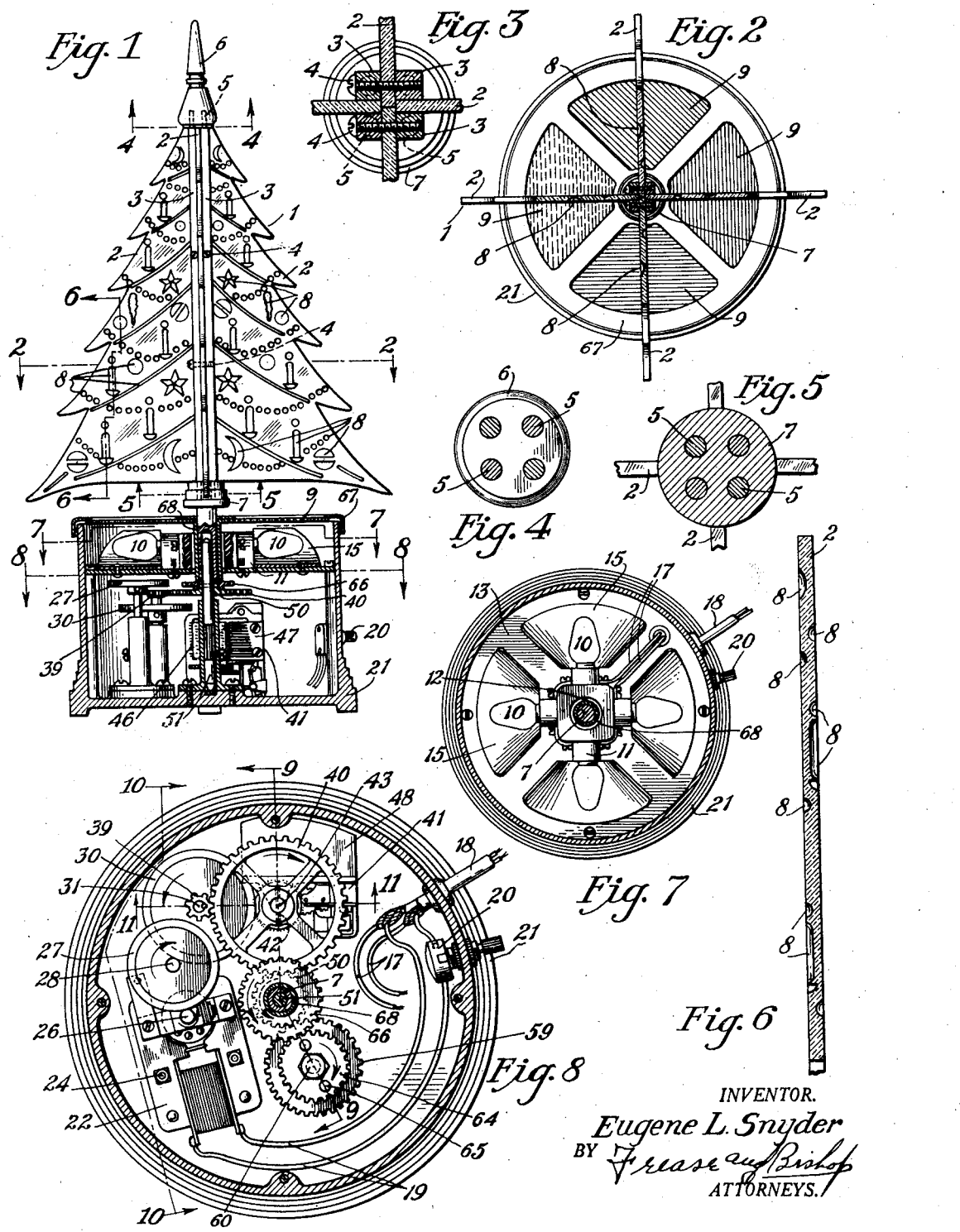
INVENTOR.
Eugene L. Snyder
BY Frease and Bishop
ATTORNEYS.

April 7, 1942.  E. L. SNYDER  2,279,182
ORNAMENTAL TREE
Filed Feb. 26, 1940   2 Sheets—Sheet 2

INVENTOR.
Eugene L. Snyder
BY
ATTORNEYS.

Patented Apr. 7, 1942

2,279,182

UNITED STATES PATENT OFFICE 2,279,182

ORNAMENTAL TREE

Eugene L. Snyder, Canton, Ohio

Application February 26, 1940, Serial No. 320,860

2 Claims. (Cl. 240—10.1)

The invention relates to imitation trees for ornamental or display purposes and more particularly to an illuminated representation of a Christmas tree.

An object of the invention is the provision of an ornamental tree formed of transparent material such as plastic and shaped to represent a pine or other evergreen tree having ornamentations molded or otherwise formed therein so as to represent a decorated Christmas tree.

Another object is to form the tree of a transparent plastic material which will transmit and reflect light in various colors from colored lamps associated therewith or clear lamps located behind colored transparent panels of Cellophane, glass or other suitable material.

A further object is to provide for a variation of colors throughout the tree by providing for relative rotation between the tree and the colored light source, by rotating either the tree or the light source or by rotating both at different speeds or in opposite directions.

A still further object is to include a musical unit comprising a rotatable cylinder with pins thereon cooperating with a steel comb or keyboard when the cylinder is rotated, the musical unit being preferably adapted to play Christmas carols.

Another object is to provide a single operating means either electrical or mechanical for relative rotation between the tree and colored light source and simlutaneously operating the musical unit.

Still another object is the provision of means for lighting the tree in various colors independently of the rotating means whereby the tree and light source may remain stationary, if desired, during the illumination of the tree.

Figure 10:
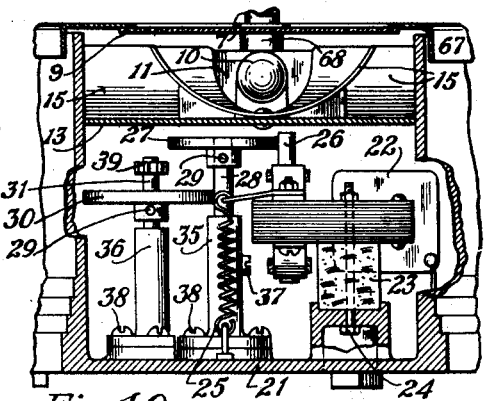
Figure 11:
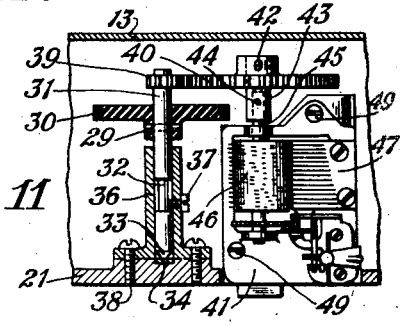
Figure 12:
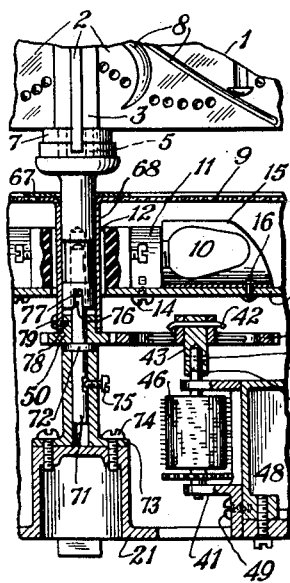
Figure 13:
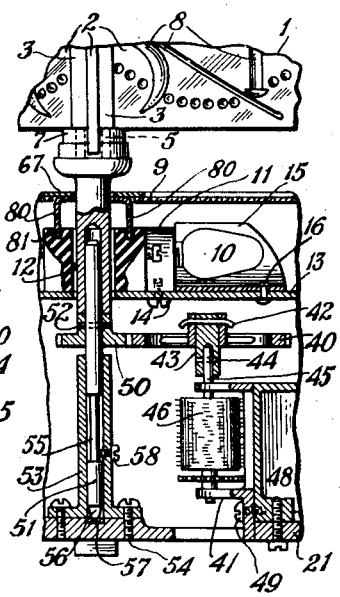
Figure 14:
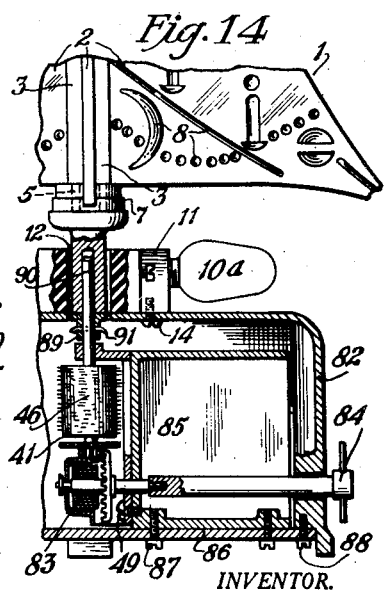

The above objects together with others which will be apparent from the drawings and following description or which may be later referred to, may be attained by constructing the improved ornamental tree in the manner illustrated in the accompanying drawings in which Figure 1 is a side elevation of an ornamental tree constructed in accordance with the invention, the base being shown in section to illustrate the colored light source, the musical unit, and a portion of the operating mechanism;

Fig. 2, a transverse section through the tree taken as on the line 2—2, Figure 1;

Fig. 3, an enlarged transverse sectional view through the central portion of the tree taken substantially at the same point as Fig. 2;

Fig. 4, a transverse section through the upper portion of the tree at the base of the top ornament taken as on the line 4—4, Figure 1;

Fig. 5, a transverse section through the trunk of the tree taken as on the line 5—5, Figure 1;

Fig. 6, a vertical sectional view through one of the vanes of the tree showing the ornamentation formed therein;

Fig. 7, a horizontal section through the light chamber of the base taken as on the line 7—7, Figure 1;

Fig. 8, an enlarged horizontal section through the gearing chamber of the base taken as on the line 8—8, Figure 1;

Fig. 9, a fragmentary vertical section through the gear drive and musical unit taken as on the line 9—9, Fig. 8;

Fig. 10, a fragmentary vertical section showing the motor and friction gearing taken as on the line 10—10, Fig. 8;

Fig. 11, a fragmentary section taken as on the line 11—11, Fig. 8;

Fig. 12, a fragmentary section similar to Fig. 9, showing a slight modification in which the tree is stationary and the colored panels arranged to rotate;

Fig. 13, a similar view showing another modification in which the colored panels are stationary and the tree arranged to rotate; and Fig. 14, a similar view showing a further modification having stationary colored lamps and the tree arranged to be rotated by a spring operated musical unit.

Similar numerals refer to similar parts throughout the several views.

The construction of the tree 1 itself may be the same throughout the several modifications, and comprises generally a plurality of vanes 2, four of such vanes being shown in the drawings, the vanes being formed of a clear transparent material which will transmit and reflect light.

For this purpose a clear synthetic resin material or plastic such as Lucite is preferably used since the same may be easily molded to produce the contour and ornamentation desired, and has the property of transmitting and reflecting either clear or colored light.

The vanes 2 may be joined together at the center of the tree by means of the square posts 3 which are connected together and to the inner edge portions of the vanes by means of screws 4.

The upper and lower ends of the posts 3 may be provided with round ends 5 adapted to be received in suitable sockets in the top ornament 6 which may be formed of metal or plastic and into the trunk portion 7 of the tree.

Any suitable ornamentation representing the decorations upon a Christmas tree may be molded or otherwise recessed in opposite sides of each vane as indicated at 8 so as to reflect light picked up from more than one of the colored transparent panels 9 which may be formed of Cellophane, glass, or other suitable material.

These colored panels may be of any desired combination of colors such, for instance, as the green, red, blue, and violet panels indicated by the shading in Fig. 2, or any other combination of more or less than four colors.

Electric lamp bulbs 10 are located beneath the colored panels 9 so as to direct colored light upward onto and through the transparent vanes 2 of the tree.

These lamp bulbs are shown as mounted in a four-way socket base 11 located within the light chamber formed in the upper portion of the base and separated from the lower chamber or compartment in which the gearing is located as by a horizontal partition wall 13.

A central opening 12 is formed in the socket base 11 for the purpose of receiving the shaft or trunk 7 of the tree. The socket base 11 may be secured to the partition 13 as by screws 14, as best shown in Fig. 9.

Reflectors 15 may be provided beneath the lamb bulbs 10 for directing the light upward through the colored panels 9, and these reflectors may be formed as an integral part of the partition wall 13 or may be separate parts connected to the partition wall as by the rivets 16.

Wires 17 connect the lamps 10 to a cable 18 which may be adapted to be plugged into the conventional base receptacle or socket and wires 19 connect the cable 18, through a switch 20, mounted upon the base 21 to the motor 22.

The base 21 may be formed of any suitable material and may be of any desired shape, preferably substantially cylindrical as shown, and is preferably formed of die cast metal or molded with plastic material.

The motor 22 is preferably an induction type, self-starting motor and may be mounted on cork blocks 23 and held in position as by the bolts 24 as best shown in Fig. 10.

A spring 25 (see Fig. 10) is provided for pulling the motor shaft 26 into frictional engagement with the friction wheel 27 fixed upon the rotatable shaft 28 as by a pin 29.

As viewed in Fig. 8, the motor shaft is arranged to rotate in counter-clockwise direction so as to rotate the friction wheel 27 in clockwise direction as indicated by the arrow in said figure.

The shaft 28 frictionally engages the wheel 30 so as to drive the same in counter-clockwise direction as indicated by the arrow in Fig. 8.

The friction wheels 27 and 30 may be both of the same construction, and attention is directed to Fig. 11 in which the wheel 30 is shown in section, the body and hub being formed of hard rubber or the like and the tire or tread of soft rubber.

Each of these wheels is secured to its shaft as by a pin 29 located through the hard rubber hub portion of the wheel.

The shaft 28 for the wheel 27, and the shaft 31 for the wheel 30 are similar, each having a groove 32 intermediate its ends and a beveled or conical lower end 33 resting upon a bearing disk 34.

A flanged bearing stand 35 supports the shaft 28 and a similar stand 36 supports the shaft 31.

Each of these shafts is prevented from accidental removal by means of a screw 37 threaded through the side wall of the stand and extending into the groove 32 of the shaft without interfering with the rotation of the shaft.

The bearing stands 35 and 36 may be attached to the bottom wall of the base 21 as by screws 38 located through the flanges of said stands.

A pinion 39 is keyed to the shaft 31 and meshes with the gear 40 to drive said gear in a clockwise direction as viewed in Fig. 8, for the purpose of operating the musical unit indicated generally at 41.

The gear 40 is fixed to the shaft 43 as by a pin 42, and the lower end of the shaft 43 is provided with a bore which receives the upper end of the shaft 45 and fixed thereto as by a pin 44.

The cylinder 46 of the musical unit is fixed upon the shaft 45 and provided with the usual teeth common in musical units of this type for engagement with the comb or keyboard 47.

The musical unit is connected to a sound box 48 as by screws 49.

A gear 50 is secured to the shaft 51 as by the pin 52 and meshes with the gear 40 on the musical unit.

In the modification shown in Fig. 12, the gear 50 is free to rotate on a stationary shaft as will be later explained, while in the other forms of the invention illustrated, this gear is fixed upon the shaft 51 as above described.

The shaft 51 is supported by a flanged bearing stand 53 secured to the bottom wall of the base 21 as by the screws 54. This shaft may be similar to the shafts 28 and 31, being provided with a groove 55 midway of its ends, a beveled lower end 56 resting on a bearing disk 57 and a screw 58 being located through the side of the bearing stand and extending into the groove 55 to prevent accidental removal of the shaft from the bearing stand without interfering with rotation of the shaft.

The lower end portion of the tree trunk or shaft 7 may be provided with a central bore to receive the upper end of the shaft 51, and rests upon the hub of the gear 50, the friction between these two parts being sufficient to cause the tree to rotate with the shaft 51 in a counter-clockwise direction.

In the preferred embodiment of the invention, illustrated in Figures 1 to 11, inclusive, both the tree and the colored light source are rotated.

The speed of rotation of the tree may be either faster or slower than the speed of rotation of the colored light source, and although the tree and light source may rotate in opposite directions the drawings show gearing provided to rotate the colored transparent panels in the same direction as the tree and at a speed of about one-half the speed of rotation of the tree, which may be approximately five revolutions per minute.

The rotation of the colored panels may be produced by means of a gear 59 meshing with the gear 50.

The gear 59 is free to rotate upon a stationary shaft 60 held against rotation as by a pin or rivet 61 located through the shaft 60 and the support 62, which may be secured to the base 21 as by screws 63.

A smaller gear 64 is mounted above the gear 59 and connected thereto as by screws 65 whereby the gears 59 and 64 will rotate together upon the shaft 60 in a clockwise direction as viewed in Fig. 8.

The gear 64 meshes with a gear 66 which is rotatably mounted upon the hub of the gear 50.

The colored transparent panels 9 may be mounted in a rotatable holder 67 to which may be secured, as by spot welding, a tubular shaft 68 surrounding the trunk 7 of the tree and operatively connected to the gear 66 as by the key 69 upon said gear which fits into a slot 70 in the tubular shaft 68.

With this construction the colored panel holder is rotated in the same direction as the tree and at a slower speed.

In the form of the invention shown in Fig. 12, the tree may remain stationary while the colored panels are revolved; for this purpose the shaft 71, which supports the tree, is provided with a flange 72 which rests upon the top of the flanged support 73, the flange of which is secured to the base 21 as by screws 74.

A set screw 75 located through the support 73 prevents rotation of the shaft 71. The gear 50 is free to rotate upon the shaft 71 and is supported upon the top of the flange 72.

The tree is held against rotation by means of the slots 76 in the trunk 7 thereof engaging the pin 77 in the shaft 71. The tubular shaft 68 which is connected to the colored panel holder 67 and surrounds the trunk 7 is provided with a slot 78 which receives a screw or pin 79 carried by the hub of the gear 50.

The motor, friction wheels and gearing in this form of the invention may be the same as previously described except for the elimination of the gears 59, 64 and 66.

With this construction the gear reduction mechanism will drive the gear 40 for the music unit and the gear 50 meshing therewith to rotate the colored panels 9 while the tree remains stationary.

In this, the same as in the preferred embodiment of the invention above described in detail, it will be seen that relative movement of the colored panels and tree will cause each portion of the tree to continuously transmit and reflect light of different colors during the operation of the device.

In Fig. 13 is shown another modification of the invention in which the tree is arranged to revolve while the colored panels remain stationary.

In this form of the invention the gearing is the same as shown and described in Fig. 12 excepting that the gear 50 is pinned to the rotatable shaft 51 as by the pin 52, the shaft 51 and its associated parts being otherwise the same as shown in Fig. 9 excepting that the gears 59, 64, and 66 and the tubular shaft 68 are eliminated and the colored panels are held against rotation by means of the angular supports 80 welded or otherwise secured to the panel holder 67.

The lamps 10 in all of the forms of the invention so far described may be replaced by removing the tree and lifting the panel holder 67 off of the top of the base.

The supports 80 rest in notches 81 in the top of the socket base 11 to prevent rotation of the panel holder.

In Fig. 14 is shown another modification in which the colored panels are eliminated and colored lamps 10a are mounted in the socket base 11.

These colored lamps may be larger than the lamps 10 and the reflectors may be eliminated. The lamps remain stationary and the tree is adapted to be revolved by the motive power of the music unit which may be a clock type spring indicated generally at 83 and arranged to be wound by a key 84 extending through the side of the base 82.

The music unit 41 is arranged to be operated by this spring through the usual gearing commonly used in musical units of this kind.

A sound box 85 is provided upon which the musical unit is mounted as by the screws 49 and the sound box may be attached to the bottom cover 86 of the base as by the screws 87, said cover being attached to the base 82 as by the screws 88.

The trunk 7 of the tree rests upon a flanged collar 89 secured to the shaft 90 of the music unit as by a pin 91.

Frictional engagement of the tree trunk 7 with the collar 89 causes the tree to rotate with the musical unit cylinder 46.

Although the relative speeds of the different parts of the device may be varied as desired without parting from the spirit of the invention, very satisfactory results have been obtained by constructing the mechanism as shown in the preferred embodiment of the invention in which the motor speed is 3300 R. P. M., the speed of the music unit 2 R. P. M., and the speed of rotation of the tree 5 R. P. M.

It should be understood that although a specific type of electric motor and gearing is illustrated for producing the desired speed of the music unit and tree with quiet operation so as not to cause objectionable noises to interfere with the reception of the music produced by the musical unit, different forms of drive mechanism and speed reduction may be used without departing from the scope of the invention.

From the above it will be obvious that I have produced an ornamental tree formed of transparent material having the appearance of glass with recessed ornamentations thereon, which presents a pleasing effect even when the same is not lighted and which has a strikingly effective way of transmitting and reflecting colored light especially when there is relative rotation between the tree and the colored light source at which time the variation of colors transmitted through and reflected by the tree produces a very striking result, regardless of whether the tree or colored light source remains stationary and the other revolves or whether both are revolved at different speeds or in opposite directions.

There are no loose parts on the tree to be lost or get out of order, and the plastic material used for the tree is slow burning, is lighter and softer than glass, and may be easily molded to shape and design and will not discolor from age or exposure to sunlight.

The tree may be easily cleaned with water and will last for many years.

The molded or recessed ornamentations upon the tree may be varied from those illustrated in the drawings and the shape of the vanes 2 and posts 3 may be changed without departing from the present idea of the design.

For display, such as in store windows, the musical unit may be dispensed with, but for other purposes it would be desirable to retain the music feature so that the effects of light, sound and motion are combined to produce the desired result.

I claim:

1. An ornamental tree including a base, a tree mounted upon the base and formed of a plurality of flat vanes of transparent material capable of transmitting light and having recessed ornamental faces in opposite surfaces thereof capable of reflecting said transmitted light, a multi-colored light source mounted upon the base projecting light to said vanes, and means in the base for producing relative rotation beteween the tree and the multi-colored light source so that different colors of light are successively transmitted through the vanes, and reflected outwardly by said ornamental faces.

2. An ornamental tree including a base, a tree rotatably mounted upon the base and formed of a plurality of flat vanes of transparent material capable of transmitting light and having recessed ornamentation in opposite surfaces thereof capable of reflecting said transmitted light, a multi-colored light source rotatably mounted upon the base projecting light on said vanes, a musical unit rotatably mounted in the base, and means in the base for rotating the tree, the multi-colored light source and the musical unit at different relative speeds, so that different colors of light are successively transmitted through the vanes and reflected outwardly by said ornamental faces.

EUGENE L. SNYDER.